July 12, 1960 H. W. FAEBER 2,944,345

DRIVE MECHANISM FOR WEB THREADING APPARATUS

Filed Jan. 30, 1958 6 Sheets-Sheet 1

INVENTOR
HARRY W. FAEBER
BY
his ATTORNEYS.

July 12, 1960    H. W. FAEBER    2,944,345
DRIVE MECHANISM FOR WEB THREADING APPARATUS
Filed Jan. 30, 1958    6 Sheets-Sheet 2

INVENTOR
HARRY W. FAEBER
BY
his ATTORNEYS.

July 12, 1960 H. W. FAEBER 2,944,345
DRIVE MECHANISM FOR WEB THREADING APPARATUS
Filed Jan. 30, 1958 6 Sheets-Sheet 3

INVENTOR.
HARRY W. FAEBER
BY
his ATTORNEYS.

July 12, 1960 H. W. FAEBER 2,944,345
DRIVE MECHANISM FOR WEB THREADING APPARATUS
Filed Jan. 30, 1958 6 Sheets-Sheet 5

INVENTOR.
HARRY W. FAEBER
BY
his ATTORNEYS.

July 12, 1960  H. W. FAEBER  2,944,345
DRIVE MECHANISM FOR WEB THREADING APPARATUS
Filed Jan. 30, 1958  6 Sheets-Sheet 6

INVENTOR.
HARRY W. FAEBER
BY
his ATTORNEYS.

United States Patent Office 2,944,345
Patented July 12, 1960

2,944,345
DRIVE MECHANISM FOR WEB THREADING APPARATUS

Harry W. Faeber, Larchmont, N.Y., assignor to Time, Incorporated, New York, N.Y., a corporation of New York Filed Jan. 30, 1958, Ser. No. 712,265

13 Claims. (Cl. 34—56)

This invention relates to web handling apparatus, and, more particularly, to a driving system for advancing a web in a tortuous path over a plurality of rolls or cylinders.

In apparatus for the processing of elongated sheets or webs, the webs are generally withdrawn from a supply roll, processed, and then either re-wound on a final roll or subjected to further processing, such as folding or cutting. In certain web handling machies, the web must travel over a number of cylinders or rolls, following a tortuous path, in order to be dried, coated, printed or otherwise processed, according to the requirements of the particular operation.

One problem encountered in such machines is that of the initial starting of the web through the machine or in other words, the threading of the web through the machine. Ordinarily, this would be done manually by grasping the leading edge of the web and threading it by hand through the machine over the various rolls in the desired tortuous path. This operation is time consuming, laborious and expensive, particularly in relatively large size machines.

A proposal for performing this web threading operation in a multi-stage printing and drying machine has been disclosed in a copending application of Harry W. Faeber, now Patent No. 2,862,705, granted December 12, 1958. This proposal utilizes a pair of spaced apart web carriers or chains which are movable along the path of the web that is being processed on opposite sides of the web. A transverse band or strip extends between the spaced apart web carriers or chains, and the leading end of the web is connected to this transverse band or strip, so that as the chains are driven and the transverse band or strip is advanced along the tortuous path through the machine, the web also is led through the machine in the desired path.

In this multi-stage printing and drying apparatus, a dual driving system is provided. This drive system includes a main drive system and an auxiliary drive system. The main drive system drives the operating parts of the apparatus, and it is utilized to drive the web threading chains during the threading operation. At the completion of the web threading operation, the main drive system is disconnected from the chains, and thereafter the auxiliary drive system serves to impart motion to the chains during the production operation of the apparatus. During the production operation the chains serve no useful purpose. However, because the intense heat of the web driers would cause damage to the portions of the chains therein, the auxiliary drive system is provided to impart a relatively slow movement to the chains so that given lengths thereof will not be subjected to this intense heat for too long a period, causing damage to the chains. The auxiliary drive system is thermostatically controlled by the temperature within the drier or driers. When the temperature therein is raised to a predetermined temperature less than an unsafe temperature for the chains, the auxiliary drive system is rendered operative. On the other hand, when the temperature within the drier or driers is well within a safe range for the chains and below the predetermined temperature, the auxiliary drive is rendered inoperative.

One of the more serious problems presented by the utilization of an endless carrier or chain for advancing the web through an apparatus of this type is the problem of the friction in driving the chains. For example, in such apparatus, numerous guide means must be employed to guide the endless carrier or chain in a predetermined path through the machine. These guides impose a considerable load on the particular drive system in use, which makes it difficult for either the main or auxiliary drive systems to drive the endless carrier or chain at a slow, controlled rate of speed.

The object of the present invention is to provide a drive system for the endless carriers or chains of the threading mechanism that will be capable of imparting a slow, controlled, continuous movement thereto when driven by the auxiliary drive system, notwithstanding the friction caused by the guide means which must be overcome in the drive of the endless carrier, and without interfering with the movement of the carrier at higher speeds when driven by the main drive system.

Another object of the invention is to provide a controlled, continuous movement to the endless carriers or chains when they are driven at slow speeds by the main drive system.

These and other objects and advantages of the invention are realized in the drive system of the present invention by the provision of a number of booster drive units arranged at strategic points along the path of the endless carrier, which are capable of assisting but not supplanting the drive which determines the controlled rate of feed of the web.

For a more complete understanding of the present invention, reference may be made to the detailed description which follows and to the accompanying drawings in which.

Figure 3:
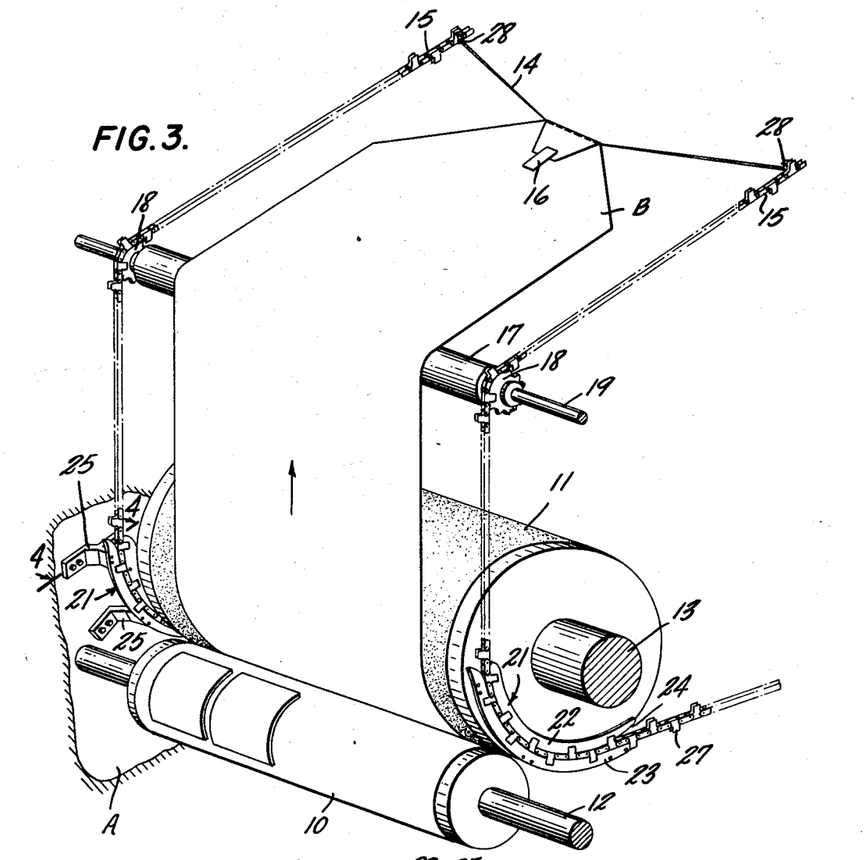
Figure 3 is an isometric view of a portion of the web handling apparatus, showing how the endless carrier leads the web through the bite of a printing couple.

The drive system of the present invention as described herein is applicable to a web processing apparatus wherein the web is first printed by one or more printing presses and then dried in one or more heated chambers to effect rapid drying of the ink. Referring to Figure 3, the printing press comprises a plate cylinder 10 and an impression cylinder 11. The cylinders 10 and and 11 are supported by transverse shafts 12 and 13, respectively, which, in turn, are supported at opposite ends in the machine frame A. The leading end of the web B is looped around an elastic band 14 which is suspended between endless carriers or chains 15 on opposite sides of the web. An adhesive tape 16 secures the turned back tab or flap of the web to the surface of the main body of the web so that the leading end of the web is guided through the apparatus by the endless carriers 15. The endless carriers 15 travel in a tortuous path between the cylinders and then through the drying apparatus at a controlled rate of speed to hasten the drying of the ink before the printed web is fed to its ultimate destination. As the web travels in a tortuous path through the drying apparatus, it is guided around a series of rollers such as the roller 17 shown in Figure 3. When the web threading operation is complete, the apparatus is driven at a substantially higher speed.

In some instances, the chains 15 in passing through the drying apparatus are guided around sprockets such as, for example, the sprockets 18 (see Figures 3 and 5) which are rotatably mounted on the shaft 19 by bearings 20 to enable the sprockets to rotate independently of the roller 17. The sprockets 18, of course, impose very little friction on the drive system.

Figure 6:
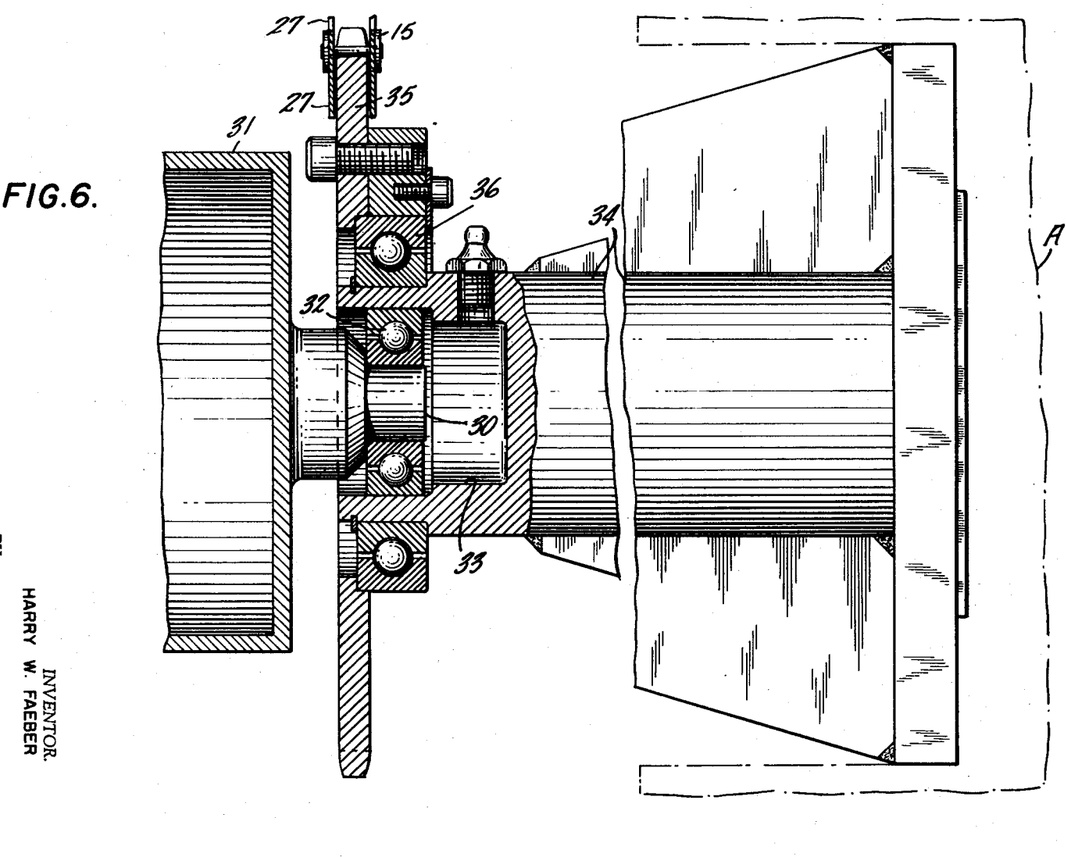
Figure 6 is a view similar to Figure 5 but illustrating an alternative embodiment.

An alternative arrangement for permitting a web guiding roller to rotate independently of its associated chain guiding sprocket is illustrated in Figure 6. In that figure, the stub shaft 30 of a web guiding roller 31 is rotatably mounted in a bearing 32 accommodated within a recess 33 formed in the end of a bearing support structure 34. The bearing support structure 34 is connected at its opposite end to the main frame A of the machine. The sprocket wheel 35 in this arrangement is rotatably supported by bearings 36 on the outer periphery of the bearing support structure 34 so as to rotate independently of the cylinder.

Figure 4:
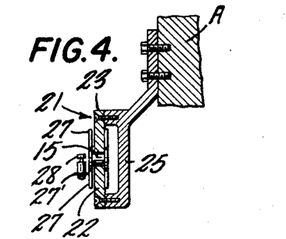
Figure 4 is a detailed sectional view, taken generally along the line 4—4 of Figure 3, looking in the direction of the arrows.

In some cases, it has been found either necessary or desirable to employ stationary guide shoes for guiding the endless chains 15 in a curved path. For example, throw-out mechanisms are generally provided to effect separation between the plate cylinder 10 and the impression cylinder 11 at certain times. Accordingly, since the axis of one or both of the cylinders will be movable from one position to another, it is generally not feasible to use guide sprockets similar to the guide sprocket 18. Therefore, in many instances it will be preferred to employ guide shoes, generally designated 21, of the type illustrated in Figure 3 of the drawings. These guide shoes comprise inner and outer shoes 22, 23, respectively. The chain 15 enters the space between the inner and outer shoes through the bell mouth opening 24, and is guided in the curved path defined between the inner and outer shoes. As shown in Figure 4, the inner and outer shoes 22 and 23 are mounted to brackets 25, which, in turn, are affixed to the main frame A of the machine.

Figure 3A:
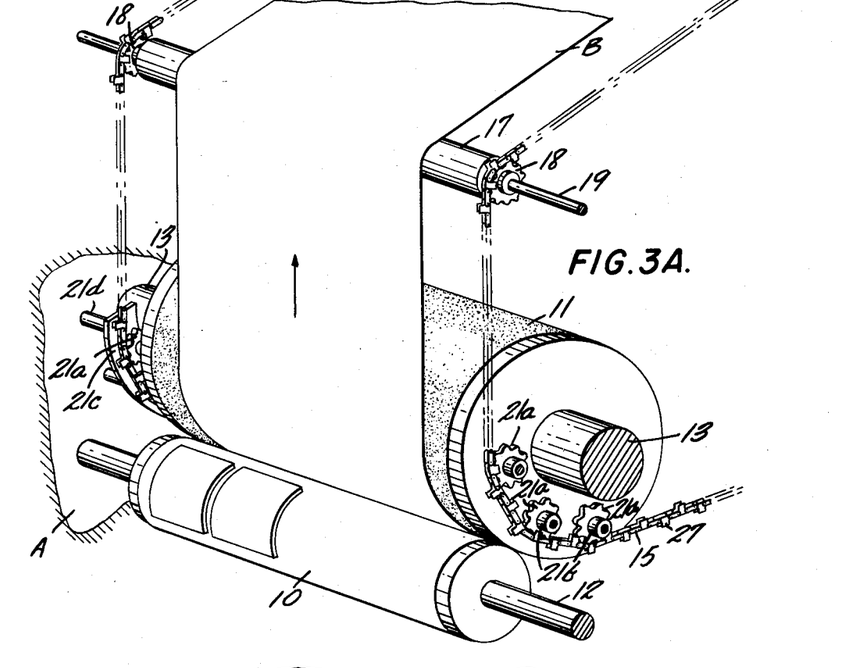
Figure 3A is a view similar to Figure 3 showing an alternative embodiment of the structure.
Figure 3B:
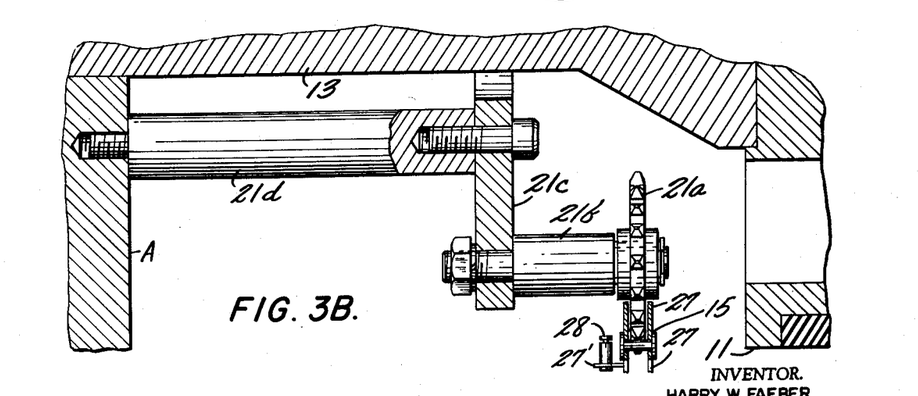
Figure 3B is an enlarged elevational view in cross-section of certain of the structure shown in Figure 3A.

An alternative embodiment of the structure illustrated in Figure 3 is shown in Figures 3A and 3B. In the arrangement illustrated in these figures, the chains are guided by ball bearing sprockets 21a which are mounted on studs 21b. The studs 21b are, in turn, fastened to a horseshoe shaped plate 21c connected to the frame A by posts 21d.

The chains 15 can be of the conventional link type. However, they each carry at spaced intervals along the chain a plurality of pairs of spaced apart lugs 27, some of which project upwardly and others of which project downwardly. These lugs engage and straddle the inner and outer shoes 22, 23, respectively, to guide the chain between the shoes and to prevent the chain from being drawn inwardly toward the center of the machine by the force exerted thereon by the elastic band 14. They also engage and straddle the sprocket wheels 18 for the same purposes.

Figure 5:
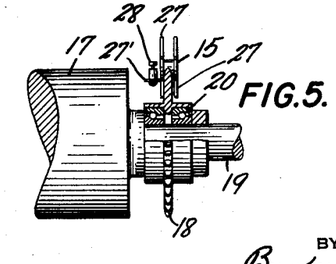
Figure 5 is an enlarged elevational view, partly in cross-section, illustrating the manner of supporting the guide sprockets for the endless carrier.

To provide means for securing the elastic band 14 to the chains, certain of the lugs, for example the lug 27' in Figure 5, are bent inwardly and a cleat 28 is mounted thereon. Such cleats are provided at spaced apart intervals along both of the chains 15.

Figure 7:
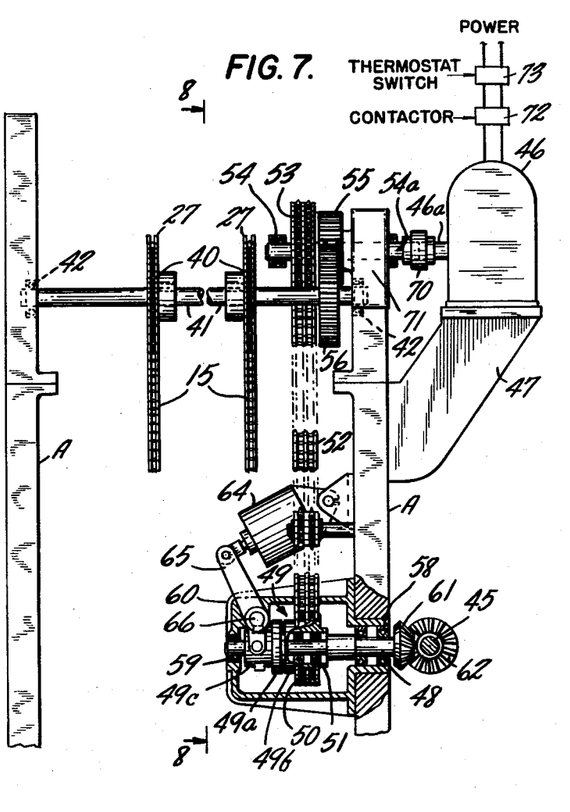
Figure 7 is an end elevational view of the apparatus showing the control mechanism for connecting and disconnecting the main and auxiliary drive systems.
Figure 8:
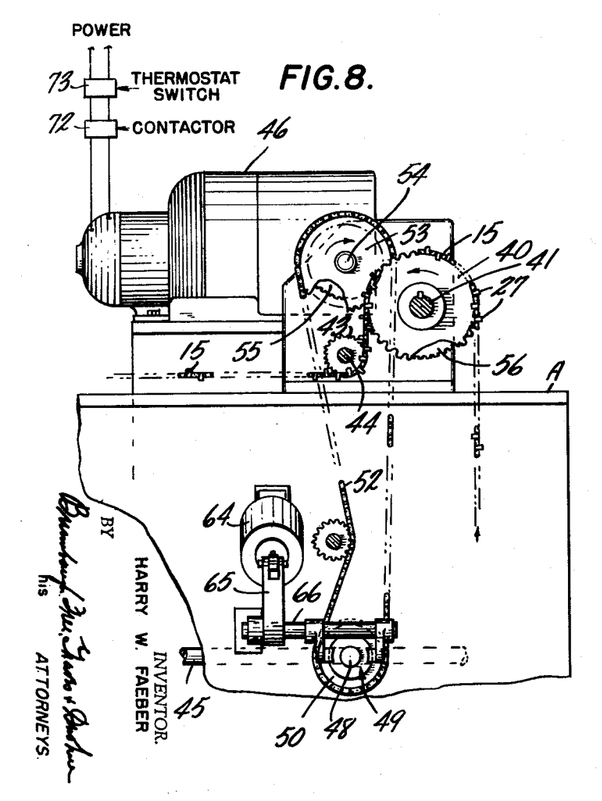
Figure 8 is a view of the apparatus taken along the line 8—8 of Figure 7, looking in the direction of the arrows.

The chains 15 are adapted to be driven at certain times by a main drive system and at other times by an auxiliary drive system. As shown in Figures 7 and 8, the driving sprockets 40 for the chains 15 are mounted on a rotatable shaft 41 which is journaled in bearings 42 of the main frame A of the machine. The chains 15 are guided around the upper portions of the sprocket wheels 40, then around the underside of the idler sprockets 43 (see Figure 8) which are supported on the transverse shaft 44. The drive shaft 41 for the drive sprocket wheels 40 can be driven either from the main shaft 45 of the machine or from an auxiliary motor 46 which is supported from one of the main side frames A of the machine by a bracket 47.

The drive transmission system between the main drive shaft 45 of the press and the shaft 41 includes a rotatable power take-off shaft 48, a clutch 49, a multiple strand sprocket wheel 50 rotatably mounted on the shaft 48 by means of bearings 51, a multiple strand chain drive 52 connecting the sprocket wheel 50 with a multiple sprocket wheel 53 carried by the shaft 54, and the meshing gears 55 and 56 affixed to the shafts 54 and 41, respectively.

The power take-off shaft 48 is rotatably mounted at one end in bearings 58 of the main frame A and at the other end in bearings 59 of a housing 60 affixed to the inner face of one of the side frames A. The shaft 48 extends through the side frame, and the extreme end thereof carries a bevel gear 61 which meshes with a bevel gear 62 of the main drive shaft 45. The drive is transmitted from the take-off shaft 48 to the multiple sprocket wheel 50 when the clutch 49 is engaged. The clutch 49 includes a shiftable jaw plate 49a and a fixed jaw plate 49b. The plate 49a is splined to the shaft 48, and the plate 49b is carried by the multiple strand sprocket wheel 50.

The movement of the plate 49a into and out of jaw engagement with the plate 49b is controlled by the air cylinder and piston 64 through a clutch operating lever 65 pivoted at 66 to the housing 60. The upper arm of the lever 65 is pivotally connected to the piston of the air cylinder, and the lower arm of the lever 65 is connected to an axially movable, non-rotatable bearing housing 49c for the rotatable clutch plate 49a. Suitable manual controls (not shown) are provided for operating the air cylinder 64 to either engage or disengage the clutch 49. When the clutch 49 is engaged, the shaft 41 is driven through the above-described transmission from the press shaft 45.

The shaft 41 and the sprocket wheels 40 can also be driven by the auxiliary motor 46 through a transmission which includes the motor shaft 46a, a flexible coupling 70 joining the shaft 46a and the clutch input shaft 54a, a unidirectional or overrunning-type clutch 71, the clutch output shaft 54, and the meshing gears 55 and 56. The auxiliary motor 46 is adapted to drive the sprocket wheels 40 at a substantially lower speed than the main press drive shaft 45 when operating at full speed. When the clutch 49 is engaged, transmitting the drive from the shaft 45 to the shaft 41, and the shaft 45 is operating at full speed, it is of no consequence whether the auxiliary motor 46 is operating or not. The overrunning clutch 71 permits the clutch output shaft 54 to be driven at a substantially higher speed than the clutch input shaft 54a. When, however, the clutch 49 is disengaged, the web threading chains 15 may be driven at a reduced speed by the auxiliary motor 46.

Figure 10:
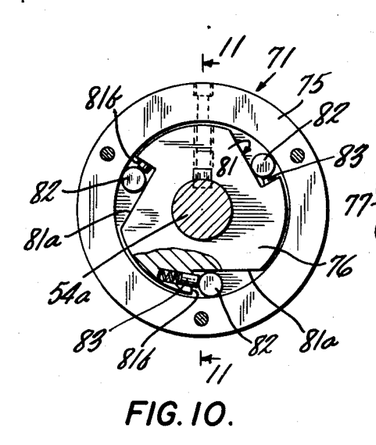
Figure 10 is an end view illustrating a clutch mechanism used in the drive transmission system.
Figure 11:
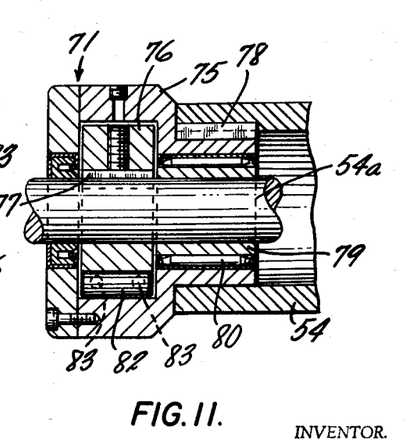
Figure 11 is a cross-sectional view of the clutch taken along a line 11—11 of Figure 10, looking in the direction of the arrows.

The conventional overrunning clutch 71 is shown in more detail in Figures 10 and 11. The clutch comprises an outer stepped annular element 75 and an inner rotatable annular element 76 accommodated within the larger end of the element 75. The motor driven shaft 54a passes through the central openings in both the elements and is coupled by means of a keyway 77 to the element 76. Adjacent the keyway 77, the shaft 54a is provided with a snug-fitting collar 79 which rotates within the needle bearings 80 between the outer periphery of the collar and the inner periphery of the smaller end of the element 75. The clutch driven shaft 54, on the other hand, has a recessed end which surrounds the smaller end of the element 75, being connected thereto by the keyway 78.

The outer periphery of the annular element 76 (as best shown in Figure 10) is provided with a plurality of notches 81 each containing a rotatable cylindrical bearing 82 therein. Each notch 81 is formed by a relatively long surface 81a and a relatively short wall 81b. A plurality of spring-urged plungers 83 are accommodated in bores in the shorter wall, and the plungers urge the cylinders away from the deeper portion of the notch. Referring to Figure 10, when the inner element 76 of the clutch is driven by the auxiliary motor in a clockwise direction, the cylinders 82 tend to move toward the shallow end of the notch and, by a wedging action, couple the outer element 75 thereto to drive the shaft 54. When, however, the clutch 49 is engaged and the shaft 41 is driven at a higher rate of speed by the main press drive shaft 45, the outer element 75 of the clutch (which is coupled directly to the shaft 41 through the shaft 54 and the gears 55 and 56) will be free to rotate in a clockwise direction at a higher rate of speed than the inner element 76 by forcing the cylinder 82 to the deeper end of the notch against the action of the spring-urged plungers 83. The depth of the deeper end of the notch is slightly greater than the diameter of the cylinder, so that the outer element 75 is free to rotate at a higher speed than the inner element. Actually, as will be explained below in greater detail in connection with Figure 9, an electrical control system insures that the auxiliary motor will be rendered inoperative when the clutch 49 is engaged, and conditioned for operation when the clutch 49 is disengaged.

The operation of the auxiliary motor 46, when conditioned for operation, is controlled by a starter or contactor 72 and a thermostatic switch 73. The thermostatic switch is controlled by a thermocouple located in the drier or driers of the machine. The thermocouple indicates the temperature within the drying chamber or chambers, and is operative to close the switch 73 when the temperature inside the drier exceeds a predetermined temperature to which the chains may be safely exposed.

The operation of the chain driving mechanism can be briefly described as follows: During the threading of the web, the clutch 49 is engaged by the operation of a manually controlled switch 112 (see Figure 9) which operates to close a contactor 115 which, in turn, controls the solenoid air valve (not shown) for the air cylinder and piston unit 64. This permits the chains 15 to be driven by the shaft 45 which, during the web threading operation, is driven at a reduced speed of rotation, substantially less than production speed. When the web threading operation is completed, the clutch 49 is disengaged, and thereafter the chains are driven under the control of the auxiliary motor 46 which advances the chains at a slow speed if the temperature in the drier or driers exceeds a predetermined level. At such times, if the temperature in the drier or driers is below the predetermined level, the auxiliary motor 46 is rendered inoperative and no movement whatsoever is imparted to the chains 15.

As explained above, the friction of the various sprockets and guides which guide the chain in its movement through the machine imposes a heavy load on the chain drive systems, making it difficult to start up the feed of the chains from rest, and it tends to cause the chains to move in intermittent fashion instead of in a smooth, continuous movement. To relieve the tension on the chain caused by the accumulated friction, one or more booster drive units are utilized at strategic points along the chain feed to assist the auxiliary drive motor 46. When in operation, the booster motors exert a steady torque, and thus tend to drive the chains 15 at the same relatively slow speed as the auxiliary motor 46.

Figure 1:
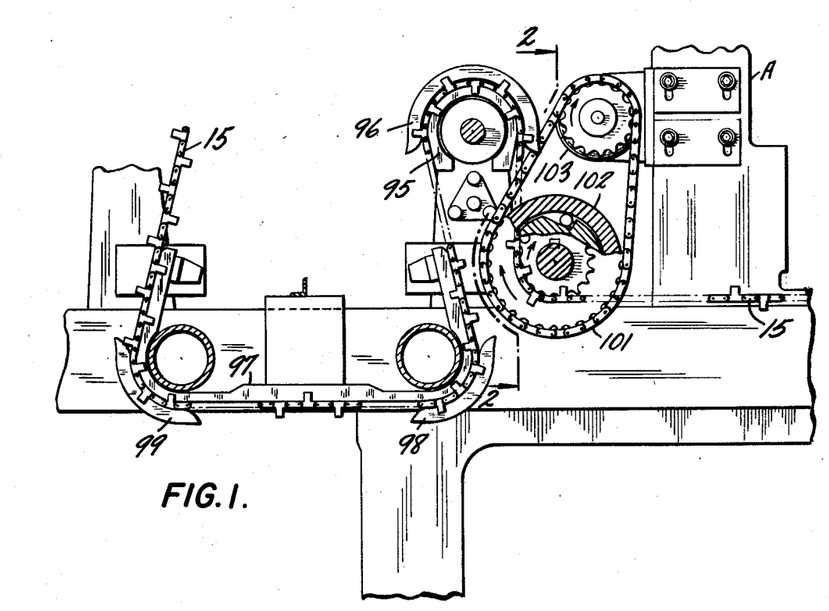
Figure 1 is a side elevation view, partly in cross-section, of a portion of the drive mechanism for the endless carrier which advances the web, showing in particular one of the supplemental or booster drive units.
Figure 2:
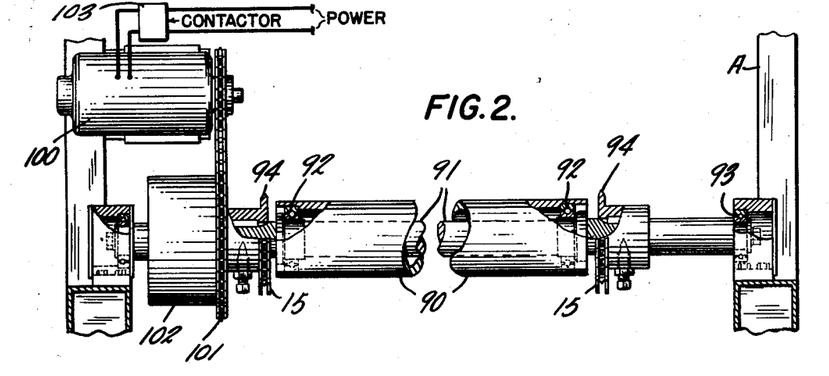
Figure 2 is a view with certain parts broken away and shown in cross-section, taken substantially along the line 2—2 of Figure 1, looking in the direction of the arrows.

A typical booster drive unit is shown in Figures 1 and 2 of the drawings. In Figure 2, a web guiding cylinder 90 of the machine is shown as being rotatably supported on a transverse shaft 91 by means of bearings 92. The shaft 91 extends between the side frames A of the machine, and the extreme ends of the shaft, in turn, are rotatably mounted in bearings 93. Sprocket wheels 94 are affixed to the shaft 91 on both sides of the cylinder 90. This arrangement permits the sprocket wheels 94 and shaft 91 to rotate independently of the web guiding cylinder 90. After passing around the sprockets 94, the chains 15 are thereafter guided between the pairs of guide shoes 95 and 96, 97 and 98, and 97 and 99, in sequence.

The shaft 91 and the sprocket wheel 94 affixed thereto are connected to the booster torque motor 100. The booster motor 100 transmits the drive to the shaft 91 through a chain 101 and an overruning clutch 102 which may be of the same type as that shown in Figures 10 and 11 of the drawings. The operation of the booster motor 100 is controlled automatically by a starter or contactor 103 and an electrical control system to be described below. In general, however, whenever the auxiliary motor 46 is running or whenever the chains 15 are driven by the main drive shaft 45 at a speed substantially less than the normal operating speed of the shaft 45, the booster motors 100 will be started automatically to transmit supplemental torque to the web threading chains 15. This additional power helps to overcome the frictional resistance produced by the various guide sprockets and shoes which guide the chains in a tortuous path through the machine, thereby imparting a slow, steady movement to the chains, notwithstanding the slow speed of the drive system in operation.

Figure 9:
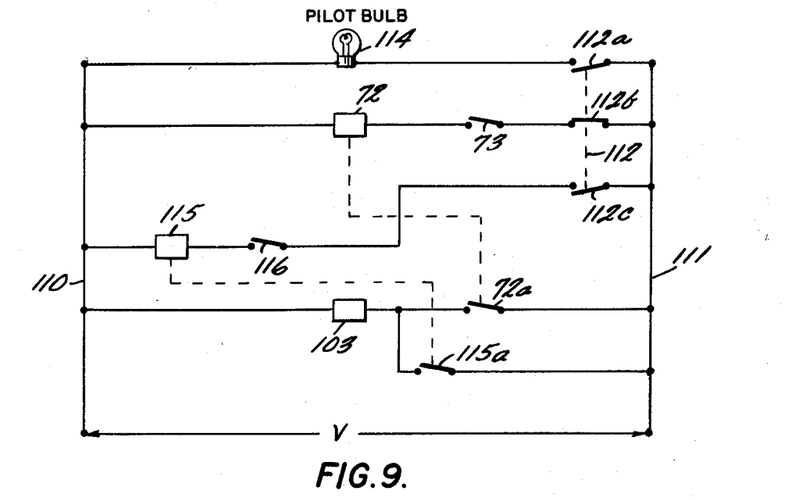
Figure 9 is a circuit diagram of an electrical control system for the auxiliary drive system and the booster drive units.

The control circuit for the auxiliary motor 46 and the booster drive motor 100 is shown in Figure 9 of the drawings. Referring to that figure, a control voltage V, which may, for example, be 110 volts A.C., is impressed across the bus conductors 110 and 111. When the press is running in production at full speed, the single throw, triple pole, manually controlled switch 112 is in the position shown. The three contacts of the switch 112 are identified by the reference numbers 112a, 112b and 112c. In the position shown, only the contact 112b is closed. The contact 112b is in series with the contactor 72 which controls the operation of the auxiliary motor 46 and the thermostatic switch 73. As explained above, the thermostatic switch is in communication with the drier, and it is adapted to be closed at a temperature well within the safe range for the chains 15, say 300° F. in the case of chains made of steel. When the temperature in the drier rises above this predetermined value, the switch 73 closes automatically, energizing the contactor 72 which (a) starts the operation of the auxiliary motor 46, and (b) closes a contact 72a in series with the contactor 103 which controls the operation of one of the booster drive motors 100. If a great many booster drive motors were to be employed in driving the chains, the contactor 72 would close the contactors associated with all of the booster motors. Thus, the booster drive motors are rendered operative whenever the auxiliary motor 46 is rendered operative.

When it is desired to stop the press and to thread a web using the chain 15, the manually controlled switch 112 is thrown, closing the contacts 112a and 112c and opening the contact 112b. The contact 112a causes a pilot light 114 to indicate that the machine is conditioned for the web threading operation. The contact 112b is opened, thereby rendering the auxiliary drive motor 46 inoperative. Also, the contact 112c which is in series with the contactor 115 and a limit switch 116 is closed. The contactor 115, as explained above, controls the operation of the solenoid operated air valve which, when energized, operates the pneumatic piston in the cylinder 64 to cause engagement of the press drive clutch 49. The switch 116 is controlled by the press speed, that is to say, by the speed of rotation of the shaft 45. When the press is turning over slowly, say at a relatively slow predetermined speed equivalent to a web speed of forty feet per minute, the switch 116 is closed. However, when the press is stopped entirely or when it is operating at a speed above the predetermined speed, the switch 116 is open, thereby disengaging the clutch 49 and opening the contact 115a. Accordingly, at low press speeds, the contactor 115 will be energized, closing the contact 115a which is in series with the contactor 103 and in parallel with the contact 72a. The closing of the contact 115a energizes the contactor 103 which, as explained above, starts up the booster drive motors 100.

It is to be noted that the booster drive motor 100 is running at all times when the auxiliary drive motor 46 is running. Since the auxiliary drive motor 46 and the booster drive motors operate at the same relatively slow speed, this permits the operation of the booster drive motor 100 to assist in moving the chain in a slow, steady movement to prevent damage to the chains by the heat in the drying chambers. However, even when the auxiliary drive motor 46 is not running, and the clutch 49 is engaged, so that the chains 15 are adapted to be driven by the press drive shaft 45, the booster drive motors 100 will be operative to assist the main drive system to impart a slow, steady movement to the chains, but only if the shaft 45 is driven at low speed, say a web speed below forty feet per minute. When the drive shaft 45 is operating at higher speeds, or when it is at rest, or in other words when the limit switch 116 is open, the booster drive motors 100 will not operate unless the auxiliary motor 46 operates, for the reason that during such times the main drive system is not clutched in to drive the threading chains.

The invention has been shown in preferred forms and by way of example only, and obviously many variations and modifications may be made therein without departing from the spirit of the invention. The invention, therefore, is not to be limited to any specified form or embodiment, except in so far as such limitations are set forth in the claims.

I claim:

1. A web handling apparatus comprising a plurality of rollers for guiding a web in a tortuous path, a pair of endless carriers, one disposed on each side of the web, means for guiding each of the carriers in the same tortuous path as the web, said carriers serving to thread the leading end of the web through the apparatus, a main drive system for the apparatus, drive coupling means for connecting the main drive system to the carriers when it is desired to thread the web through the apparatus and for disconnecting the main drive system from the carriers when the web threading operation has been completed, supplemental drive means for advancing the carriers at a relatively slow speed, and overrunning clutch means coupling the supplemental drive means and the carriers, permitting the supplemental drive means to advance the carriers slowly without interferring with the main drive system advancing them at a faster speed.

2. A web handling apparatus as set forth in claim 1 including control means for controlling the operation of said drive coupling means to disconnect said main drive system from the endless carriers at operating speeds of the main drive system exceeding a predetermined speed.

3. An apparatus in which a web is fed through a printing press and a drying chamber comprising a plurality of rollers for guiding a web through the printing press and the drying chamber, a pair of endless carriers, one disposed on each side of the path of the web, said carriers serving to thread the leading end of the web through the apparatus, a main drive system for the apparatus, drive coupling means for connecting and disconnecting the main drive system to and from the carriers, auxiliary drive means for imparting a relatively slow movement to the carriers, thermostatic control means for rendering operative the auxiliary drive means when the temperature in the drying chamber exceeds a predetermined safe temperature for the carriers, an overrunning clutch coupling the auxiliary drive means with the endless carriers, permitting the auxiliary drive means to advance the carriers slowly without interfering with the main drive system advancing them at a faster speed, booster drive means to assist in driving the endless carriers at a slow speed, and an overrunning clutch coupling the booster drive means with the endless carriers, permitting the booster drive means to assist in driving the carriers at a slow speed without interfering with the main drive system advancing them at a faster speed.

4. An apparatus as set forth in claim 3 including control means to render operative the booster drive means whenever the auxiliary drive means is rendered operative.

5. An apparatus as set forth in claim 3 including control means to render said booster drive means operative when the main drive system operates at less than a predetermined speed.

6. An apparatus as set forth in claim 3 including control means for controlling the operation of said drive coupling means to disconnect said main drive system from the endless carriers at operating speeds of the main drive system exceeding a predetermined speed.

7. An apparatus in which a web is fed to a printing press and a drying chamber comprising a plurality of rollers for guiding the web through the printing press and the drying chamber, a pair of endless carriers, one disposed on each side of the path of the web, said carriers serving to thread the leading end of the web through the apparatus, a main drive system for the apparatus, a clutch for connecting and disconnecting the main drive system to and from the carriers, auxiliary drive means for imparting movement to the carriers, thermostatic control means for rendering operative the auxiliary drive means when the temperature in the drying chamber exceeds a predetermined safe temperature for the carriers, booster drive means to assist in driving the endless carriers at a relatively slow speed, and an overrunning clutch coupling the booster drive means with the endless carriers, permitting the booster drive means to assist in driving the carriers at a slow speed without interfering with the drive of the carriers at a faster speed.

8. An apparatus in which a web is fed to a printing press and a drying chamber comprising a plurality of rollers for guiding the web through the printing press and the drying chamber, a pair of endless carriers, one disposed on each side of the path of the web, said carriers serving to thread the leading end of the web through the apparatus, a main drive system for the apparatus, a clutch for connecting and disconnecting the main drive system to and from the carriers, an auxiliary drive means for imparting relatively slow movement to the carriers, booster drive means to assist in driving the endless carriers at a relatively slow speed, an overrunning clutch coupling the booster drive means with the endless carriers, permitting the booster drive means to assist in driving the carriers at a slow speed without interfering with the drive of the carriers at a faster speed, an electrical control system including switch means to condition said auxiliary drive means for operation and at the same time to disengage the clutch which connects the main drive system to the carriers, and a thermostatically controlled switch for rendering operative the auxiliary drive means, after it has been first conditioned for operation by the operation of said switch means, when the temperature in the drying chamber exceeds a predetermined safe temperature for the carriers.

9. An apparatus as set forth in claim 8 including means for rendering operative the booster drive means whenever the auxiliary drive means is rendered operative.

10. An apparatus as set forth in claim 8 wherein said switch means is also operable to uncondition the auxiliary drive means for operation and to engage said clutch to connect the main drive system to the carriers.

11. An apparatus as set forth in claim 10 including means for rendering operative the booster drive means whenever (a) the main drive system is operating at a reduced rate of speed less than a predetermined value, and (b) the clutch connecting the main drive system to the carriers is engaged.

12. An apparatus as set forth in claim 10 including automatically controlled switch means controlled by the speed of operation of the main drive system for preventing the engagement of said clutch under the control of said switch means when the speed of operation of said main drive system is less than a predetermined value.

13. An apparatus as set forth in claim 8 including means for rendering operative the booster drive means (a) whenever the auxiliary drive means is rendered operative, and (b) whenever the clutch is engaged to connect the main drive system to the carriers and the main drive system is operating at a reduced speed less than a predetermined value.

No references cited.